Patented Nov. 15, 1949

2,488,268

UNITED STATES PATENT OFFICE 2,488,268

METHODS OF PREPARING UREA-(STIBANILIC ACID) REACTION PRODUCTS

Walter G. Christiansen, Glen Ridge, N. J., and Louis W. Green, New York, N. Y., assignors to E. R. Squibb & Sons, New York, N. Y., a corporation of New York No Drawing. Application October 6, 1945,
Serial No. 620,844

2 Claims. (Cl. 260—446)

This invention relates to certain antimonials for the treatment of kala azar and other "tropical" diseases.

The antimonial known as "urea-stibamine" was introduced by Brahmachari in 1921, and its efficacy in the treatment of kala azar has since been amply demonstrated. This antimonial has been alleged to be a compound (or complex) of urea and stibanilic acid, and its elemental composition has been given as:

|  | Per cent |
|---|---|
| Carbon | 20.2–21.5 |
| Hydrogen | 2.7–3.0 |
| Nitrogen | 6.5–6.8 |
| Antimony | 44.2–48.6 |

(cf. Journal of Tropical Medicine & Hygiene, 44, 67, 1941). Apparently, complete detailed information as to the method of preparing this compound has never been published; and attempts by others to produce a "Brahmacharoid composition" (a compound or complex having the aforementioned elemental composition) have generally resulted in failure, as indicated by the following antimony contents given by assay of their products:

|  | Per cent |
|---|---|
| Niyogi [J. Indian Chem. Soc. 5, 753–7 (1928)] | 36.6 |
| Ghosh [Ind. J. Med. Res. 16, 461 (1928)] | 36.6–43.9 |
| Guha, Dutta and Mukuji [Nature 151, 108 (1943)] | 39–42 |

It is the object of this invention to provide: (I) simple and efficient methods of preparing Brahmacharoid compositions useful for the treatment of kala azar and other tropical diseases; (II) a "simple" urea-(stibanilic acid) reaction product useful both as an intermediate for the production of Brahmacharoid compositions and as an agent for the treatment of kala azar and other tropical diseases; and (III) a method of preparing said "simple" reaction product.

The "simple" urea-(stibanilic acid) reaction product is obtained by heating a mixture of freshly-prepared, unisolated stibanilic acid with an excess of urea in an aqueous reaction medium, mixing the reaction mixture with an acetone-type organic solvent (e. g., acetone, methyl ethyl ketone or diethyl ketone), especially with acetone, and recovering the resulting precipitate. [The term "unisolated," as employed herein, has reference to the moist-precipitate (or undried-magma) form obtained in the preparation of the compound.] It is believed that the reaction product has the following structure

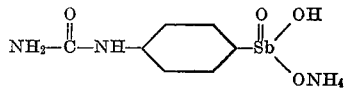

but it is not intended that the invention be limited by any theoretical considerations.

This simple reaction product may be converted into a Brahmacharoid composition by aging an aqueous solution thereof and removing the insoluble fraction formed; and the Brahmacharoid composition formed is conveniently isolated by mixing the clear solution with an acetone-type organic solvent, especially acetone, and recovering the resulting precipitate.

A substantially-identical Brahmacharoid composition may be obtained directly by heating a mixture of about 5 moles urea, about 2 moles freshly-prepared, unisolated stibanilic acid, and about 1 mole freshly-prepared, unisolated antimonic hydroxide in an aqueous reaction medium, and removing the insoluble material; and the Brahmacharoid composition formed is conveniently isolated by mixing the reaction mixture with an acetone-type organic solvent, especially acetone, and recovering the resulting precipitate.

The following examples are illustrative of the invention:

Example 1

52 g. acetyl-stibanilic acid is hydrolyzed by warming with 680 cc. 5% sodium hydroxide solution for 3½ hours at 60° C.; the reaction mixture is filtered; the filtrate is diluted with 680 cc. water, charcoaled (treated with charcoal and filtered), and acidified with 175 cc. 30% acetic acid while maintaining the temperature below 25° C.; and the precipitated solid is filtered off and washed with two 50 cc. portions water. The moist filter cake thus obtained consists of 44 g. stibanilic acid and 46 g. water.

The freshly-prepared, unisolated stibanilic acid (the moist filter cake) is mixed with 500 cc. water and 220 g. urea, and the mixture is heated in a bath of boiling water and stirred for two hours. After standing 12–16 hours, the reaction mixture is filtered; and the filtrate, after standing 24 hours, is refiltered, yielding 600 cc. of a clear reddish-brown solution. This solution is then added in fast drops, while stirring, to 6 liters acetone; and after chilling for an hour, the precipitated product is filtered off, washed 3 times with cold acetone, and dried in vacuo. The product, obtained in a yield of 28 g., is a buff powder, yielding a hazy-to-clear 5% aqueous solution having a pH of 6.3 to 6.7. Its antimony and nitrogen contents, 38.2–39.7% and 13.2–13.4%, respectively, agree with the calculated figures (antimony 37.6%, nitrogen 13%) for a "simple" urea-stibanilic acid reaction product of the formula:

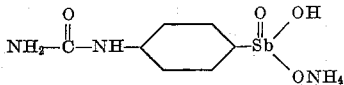

Example 2

13.5 g. of the "simple" urea-stibanilic acid reaction product obtained as described in the foregoing example, is dissolved in 54 cc. water, and the solution is allowed to stand for two days. The solution is then centrifuged, a slight white sediment having formed; and the supernatant liquor is added slowly with stirring to 500 cc. acetone. After stirring the mixture an additional fifteen minutes, the precipitated product is filtered off, washed with acetone, and dried in vacuo. The product, obtained in a yield of 9.2 g., is a buff powder yielding a hazy-to-clear pale 5% aqueous solution having a pH of 5.8–5.9. Its antimony and nitrogen contents, 42.2–45.3% and 6.4–7.0%, respectively, indicate it to be a Brahmacharoid composition.

Example 3

15 g. acetyl-stibanilic acid is hydrolyzed by warming with 200 cc. 5% sodium hydroxide solution for 4 hours at 60° C., and the resulting solution is filtered. The filtrate is diluted with 200 cc. water, charcoaled, and acidified with 40 cc. 30% acetic acid; the precipitated stibanilic acid is separated by centrifugation; and the sediment is washed (in the centrifuge cup) with 35 cc. water and further centrifuged, yielding a mush weighing 70 g. (calculated to consist of 13 g. stibanilic acid and 57 g. water).

7.4 g. antimony pentachloride is converted to the hydroxide by dilution with water and neutralization with 4 cc. 40% sodium hydroxide solution; the precipitated hydroxide is separated by centrifugation; and the sediment is washed four times with water to free it of chloride, and finally centrifuged to yield wet antimonic hydroxide.

The stibanilic acid mush is mixed with the wet antimonic hydroxide and 4.5 g. urea, and 20 cc. water is added; and the mixture is heated in a bath of boiling water for a half hour. Then 3 g. urea is added, and the heating continued for another hour. After standing 12–16 hours, the mixture is centrifuged; and the separated solution (about 80 cc. of a reddish-brown faintly opalescent liquid) is added slowly with stirring to 600 cc. acetone. The solid formed is filtered off, washed with acetone and dried in vacuo. The product, obtained in a yield of 5 g., is a buff powder yielding an initially-clear, pale-yellow 5% aqueous solution having a pH of 5.2. Its antimony and nitrogen contents, 45.7% and 6.4%, respectively, indicate it to be a Brahmacharoid composition substantially identical with that obtained in Example 2.

The stibanilic acid employed in the practice of this invention may be prepared by procedures other than those detailed in the foregoing examples, as long as the stibanilic acid is not isolated (i. e., dried or otherwise separated from the medium in which it is prepared); and the antimonic hydroxide employed in the practice of this invention also may be otherwise obtained without isolation from its preparation medium. The acetone utilized in the procedure of the foregoing examples may be replaced by other organic solvents of the acetone type (low-boiling, water-miscible aliphatic ketones).

The invention may be variously otherwise embodied within the scope of the appended claims.

We claim:

1. The method of preparing a Brahmacharoid composition which comprises heating a mixture of freshly-prepared, unisolated stibanilic acid with an excess of urea in an aqueous reaction medium, mixing the reaction mixture with an acetone-type organic solvent, preparing an aqueous solution of the resulting precipitate, and after about two days removing the insoluble fraction formed, mixing the clear solution with an acetone-type organic solvent, and recovering the resulting precipitate.

2. The method of preparing a Brahmacharoid composition which comprises dissolving in water a urea-stibanilic acid reaction product having antimony and nitrogen contents of about 38.2–39.7% and about 13.2–13.4%, respectively, and, after about two days, removing the insoluble fraction formed, mixing the clear solution with an acetone-type organic solvent, and recovering the resulting precipitate.

WALTER G. CHRISTIANSEN.
LOUIS W. GREEN.

REFERENCES CITED

The following references are of record in the file of this patent:

UNITED STATES PATENTS

| Number | Name | Date |
| --- | --- | --- |
| 1,988,632 | Schmidt I | Jan. 22, 1935 |
| 2,215,430 | Schmidt II | Sept. 17, 1940 |

FOREIGN PATENTS

| Number | Country | Date |
| --- | --- | --- |
| 309,184 | Great Britain | July 7, 1930 |
| 311,448 | Great Britain | May 13, 1929 |
| 327,996 | Great Britain | Apr. 15, 1930 |
| 357,860 | Great Britain | Oct. 1, 1931 |
| 485,273 | Germany | Oct. 28, 1929 |
| 502,046 | Germany | July 4, 1930 |

OTHER REFERENCES

Brahmachari Indian J. Med. Res. vol. 10 (1922), p. 508.

Brahmachari & Dos Indian J. Med. Res. vol. 12 (1924), p. 423.

Niyogi Indian Chem. Jour. vol. 5 (1928), p. 756.

Ghosh Indian J. Med. Res. vol. 16 (1928), p. 461.

Guha et al. Nature vol. 151 (1943), p. 108.